US010416893B2

(12) United States Patent
Lee et al.

(10) Patent No.: US 10,416,893 B2
(45) Date of Patent: Sep. 17, 2019

(54) METHODS OF OPERATING MOBILE DEVICES AND MOBILE DEVICES

(71) Applicant: SAMSUNG ELECTRONICS CO., LTD., Suwon-si, Gyeonggi-Do (KR)

(72) Inventors: Jae-Bum Lee, Yongin-si (KR); Seung-Yong Shin, Seoul (KR); Seok-Heon Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 34 days.

(21) Appl. No.: 15/461,152

(22) Filed: Mar. 16, 2017

(65) Prior Publication Data
US 2017/0308300 A1 Oct. 26, 2017

(30) Foreign Application Priority Data

Apr. 25, 2016 (KR) .................. 10-2016-0049879

(51) Int. Cl.
G06F 12/00 (2006.01)
G06F 3/06 (2006.01)

(52) U.S. Cl.
CPC ............ *G06F 3/061* (2013.01); *G06F 3/0631* (2013.01); *G06F 3/0655* (2013.01); *G06F 3/0665* (2013.01); *G06F 3/0679* (2013.01); *G06F 3/0685* (2013.01); *G06F 3/0688* (2013.01); *G06F 3/0689* (2013.01)

(58) Field of Classification Search
None
See application file for complete search history.

(56) References Cited

U.S. PATENT DOCUMENTS

| 6,996,743 | B2 | 2/2006 | Knapp, III |
| 7,904,672 | B2 | 3/2011 | Danilak |
| 8,112,586 | B1 * | 2/2012 | Reiner ................ G06F 12/0897 711/119 |
| 8,321,597 | B2 | 11/2012 | Yu et al. |
| 8,601,311 | B2 | 12/2013 | Horn |
| 8,694,727 | B2 * | 4/2014 | Naganuma ............. G06F 3/061 711/114 |
| 8,700,950 | B1 | 4/2014 | Syu |
| 8,799,743 | B2 | 8/2014 | Resnick |
| 8,954,668 | B2 | 2/2015 | Benhase et al. |
| 2003/0023809 | A1 * | 1/2003 | Oldfield ............. G06F 11/1076 711/114 |
| 2003/0033487 | A1 | 2/2003 | Pfister et al. |

(Continued)

*Primary Examiner* — Ryan Bertram
*Assistant Examiner* — Trang K Ta
(74) *Attorney, Agent, or Firm* — F. Chau & Associates, LLC

(57) ABSTRACT

A method of operating a mobile device including an embedded storage having a first capacity includes recognizing, in an application processor of the mobile device, that an external storage is connected to the mobile device, and measuring a performance of the external storage in the application processor of the mobile device. When the performance is equal to or greater than a reference value, the embedded storage and the external storage are constituted into one parallel processing storage, and workload is allocated by memory control module of the application processor to the embedded storage and the external storage based on a first performance of the embedded storage and a second performance of the external storage.

19 Claims, 22 Drawing Sheets

(56) References Cited

U.S. PATENT DOCUMENTS

| | | | |
|---|---|---|---|
| 2007/0214316 A1 | 9/2007 | Kim | |
| 2008/0195590 A1* | 8/2008 | Nakamura | G06F 16/9577 |
| 2009/0138625 A1 | 5/2009 | Lee et al. | |
| 2009/0228650 A1* | 9/2009 | Rossario | G06F 1/1626 |
| | | | 711/114 |
| 2010/0017556 A1* | 1/2010 | Chin | G06F 12/0246 |
| | | | 711/103 |
| 2010/0306468 A1 | 12/2010 | Shionoya | |
| 2011/0161779 A1* | 6/2011 | Otsuka | H03M 13/2906 |
| | | | 714/758 |
| 2011/0258365 A1 | 10/2011 | Cho | |
| 2012/0117320 A1* | 5/2012 | Pinchover | G06F 3/0611 |
| | | | 711/112 |
| 2012/0278566 A1* | 11/2012 | Gilson | G06F 12/00 |
| | | | 711/159 |
| 2012/0284587 A1* | 11/2012 | Yu | G06F 3/0608 |
| | | | 714/773 |
| 2013/0019062 A1 | 1/2013 | Bennett et al. | |
| 2013/0060985 A1* | 3/2013 | Yu | G06F 13/16 |
| | | | 710/305 |
| 2013/0086316 A1* | 4/2013 | Shah | G06F 12/0866 |
| | | | 711/113 |
| 2014/0173268 A1* | 6/2014 | Hashimoto | G06F 11/0754 |
| | | | 713/2 |
| 2014/0181400 A1* | 6/2014 | Lin | G06F 3/0613 |
| | | | 711/114 |
| 2015/0269025 A1* | 9/2015 | Krishnamurthy | G06F 11/1092 |
| | | | 714/6.24 |
| 2016/0370997 A1* | 12/2016 | Maroney | G06F 3/0683 |

* cited by examiner

METHODS OF OPERATING MOBILE DEVICES AND MOBILE DEVICES

CROSS-REFERENCE TO RELATED APPLICATION

This U.S. application claims priority under 35 USC § 119 from, and the benefit of, Korean Patent Application No. 10-2016-0049879, filed on Apr. 25, 2016 in the Korean Intellectual Property Office (KIPO), the contents of which are herein incorporated by reference in their entirety.

BACKGROUND

1. Technical Field

Exemplary embodiments are directed generally to user devices, and more particularly to methods of operating mobile devices and mobile devices.

2. Discussion of the Related Art

In general, an external memory is coupled to a mobile device. When a user couples the external memory to a mobile device, only the data storage capacity of the mobile device increases.

SUMMARY

Some exemplary embodiments are directed to a method of operating a mobile device that includes an external storage and can enhance performance while increasing storage capacity.

Some exemplary embodiments are directed to a mobile device that includes an external storage and can enhance performance while increasing storage capacity.

According to exemplary embodiments, a method of operating a mobile device that includes an embedded storage having a first capacity includes recognizing, in an application processor of the mobile device, that an external storage having a second capacity is connected to the mobile device, measuring a performance of the external storage in the application processor, constituting the embedded storage and the external storage into one parallel processing storage, when the performance is equal to or greater than a reference value, in the application processor, and allocating workload by a memory control module of the application processor to the embedded storage and the external storage based on a first performance of the embedded storage and a second performance of the external storage.

According to exemplary embodiments, a mobile device includes an embedded storage, an application processor, a volatile memory interface and an external memory interface. The embedded storage has a first capacity and stores application programs and user data. The application processor executes application programs and includes a memory control module. The volatile memory device stores a driving data used by an application program. The external memory interface provides a connection from the mobile device to an external storage. When the external storage is connected to the mobile device, the memory control module measures a performance of the external storage, constitutes the embedded storage and the external storage into one parallel processing storage when the performance is equal to or greater than a reference value, and allocates workload to the embedded storage and the external storage based on a first performance of the embedded storage and a second performance of the external storage.

According to exemplary embodiments, a method of operating a mobile device that includes an embedded storage, where the embedded storage includes a default area and a first free area, includes recognizing that an external storage is connected to the mobile device, where the external storage includes a remaining area and a second free area, checking a capacity of the first free area in the embedded storage; checking a usability of the external storage; constituting a first redundant array of independent disks (RAID) from the first free area of the embedded storage and the second free area of the external storage when a performance of the external storage is equal to or greater than a reference value; and determining a usage policy of the remaining area. The embedded storage and the external storage are nonvolatile.

According to exemplary embodiments, when a performance of the external storage connected to a mobile device is equal to or greater than a reference value, a RAID is constituted by a portion of the embedded storage and a portion of the external storage, and data processing speed can be increased. In addition, another a portion of the external storage may be variously used according to a usage policy, and thus a usability of the external storage can be increased.

DETAILED DESCRIPTION OF THE EMBODIMENTS

Various exemplary embodiments will be described more fully hereinafter with reference to the accompanying drawings, in which some exemplary embodiments are shown.

Figure 1:
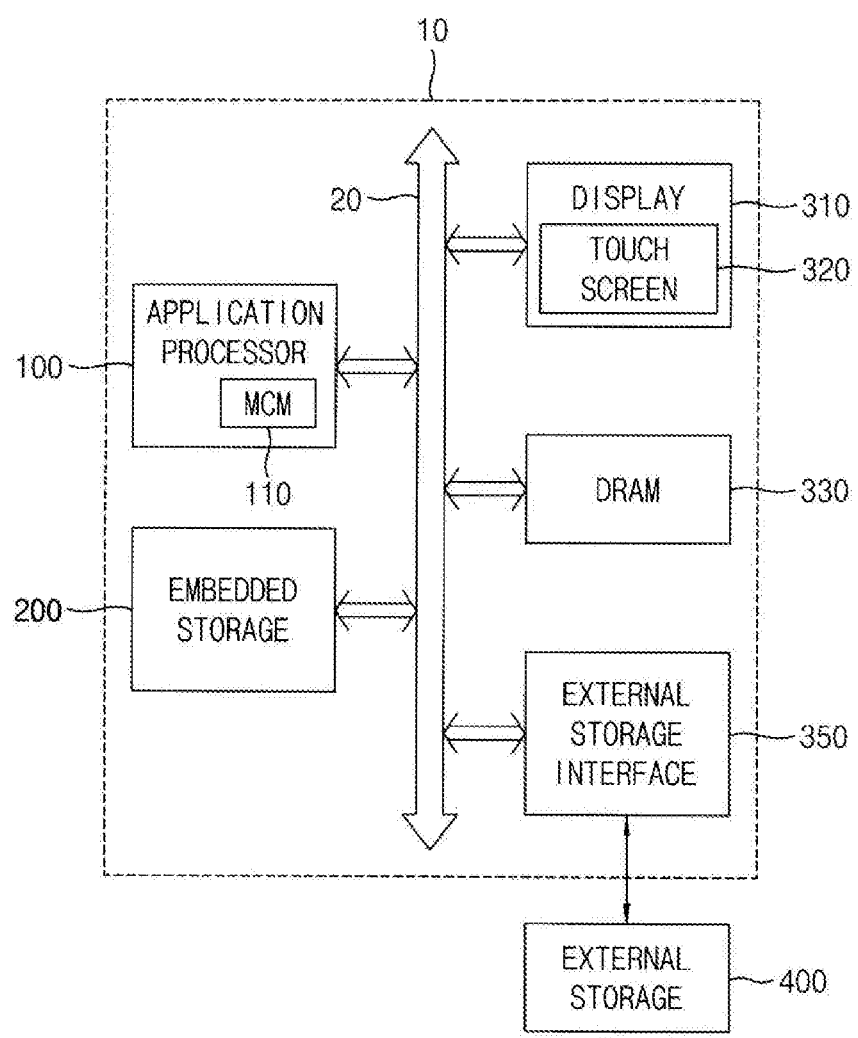
FIG. 1 is a block diagram of a mobile or electronic device according to exemplary embodiments.

FIG. 1 is a block diagram of a mobile or electronic device according to exemplary embodiments.

Referring to FIG. 1, a mobile device 10 includes an application processor 100, an embedded storage 200, a display 310, a volatile memory device 330 and an external storage interface 350.

According to embodiments, the application processor 100, the embedded storage 200, the display 310, the volatile memory device 330 and the external storage interface 350 are connected to each other through a bus 20. Although FIG. 1 shows an example of directly connecting components of the mobile device 10 to the bus 20, some or all of the components of the mobile device 10 can be connected to the bus through interface units.

According to embodiments, the application processor 100 is configured to control the overall operation of the mobile device 10. The application processor 100 is configured to drive various programs, such as application programs, a file system, device drivers, etc. As will be explained in detail below, the application processor 100 includes a memory control module 110 that determines a usage policy of a remaining area of an external storage 400.

According to embodiments, the embedded storage 200 can be used as a main storage and may include a nonvolatile memory. For example, the embedded storage 200 can include a NAND flash memory. Various types of data, for example, data required for a basic operation of the mobile device 10, such as a boot loader, an operating system (OS) image, application programs, etc., and user data, such as game programs, etc., can be stored in the embedded storage 200.

According to embodiments, the display 310 displays images and includes a touch screen or a touch screen panel 320 for touch input. The volatile memory device (DRAM) 330 can be used as a working memory.

According to embodiments, data processed or required by the application processor 100 can be loaded into the DRAM 330. The external storage interface 350 connects the external storage 400 to the mobile device 10. The external storage 400 can be used in accordance with user needs.

According to embodiments, when the external storage 400 is connected to the mobile device 10, the mobile device 10 measures a performance of the external storage 400, constitutes the embedded storage 200 and the external storage 400 into one parallel processing storage when the performance is equal to or greater than a reference value, and allocates workload to the embedded storage 200 and the external storage 400 based on a first performance of the embedded storage 200 and a second performance of the external storage 400.

According to embodiments, the mobile device 10 may be a laptop computer, a mobile phone, a table personal computer (PC), a personal digital assistant (PDA), an enterprise digital assistant (EDA), a digital still camera, a digital video camera, a portable multimedia player (PMP), a personal navigation device (PND), a handheld game console, a mobile internet device (MID), a wearable computer, or an e-book.

Figure 2A:
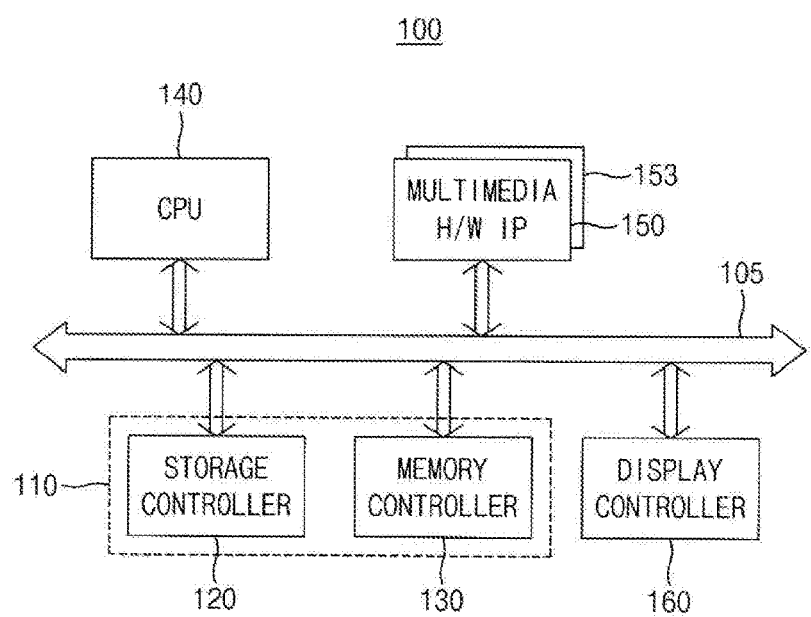
FIG. 2A is a block diagram of an application processor in a mobile device of FIG. 1 according to exemplary embodiments.

FIG. 2A is a block diagram of an application processor in a mobile device of FIG. 1 according to exemplary embodiments.

Referring to FIG. 2A, according to embodiments, the application processor 100 include a bus 105, a central processing unit (CPU) 140, a memory control module 110, a plurality of multimedia hardware circuits 150 and 153, and a display controller 160. The memory control module 110 includes a storage controller 120 and a memory controller 130.

According to embodiments, the CPU 140 controls operations of each component 120, 130, 150, 153 and 160 via the bus 105. The CPU 140 may be embodied in a multi-core processor that includes a plurality of cores.

According to embodiments, the storage controller 120 controls an operation of writing a corresponding program or corresponding data into the embedded storage 200 and an operation of reading a corresponding program or corresponding data from the embedded storage 200. In addition, the storage controller 120, when the external storage 400 is connected to the mobile device 10 under control of the CPU 140, can constitute the embedded storage 200 and the external storage 400 into one parallel processing storage to increase data processing speed.

According to embodiments, the memory controller 130 controls an operation of writing a corresponding program or corresponding data to the volatile memory device 330 and an operation of reading a corresponding program or corresponding data from the volatile memory device 330.

According to embodiments, for convenience of description in FIG. 2A, two multimedia hardware circuits 150 and 153 are illustrated; however, this is only an example, and there may be more or fewer multimedia hardware circuits in other embodiments.

For example, a multimedia hardware circuit may be embodied in a video codec or a multi format codec (MFC). The video codec denotes hardware which can compress or de-compress digital video data.

In addition, according to embodiments, the multimedia hardware circuit can be embodied in hardware that supports a JPEG standard, a scaler, a rotator, a hardware accelerator for multimedia, a 3D graphics engine, a 2D graphics engine, or a MP3 player.

According to embodiments, the display controller 160 controls an operation of the display 310. For example, the display controller 160 can display multimedia data, such as image data or 3D image data, received from one of the plurality of multimedia hardware circuits 150 and 153.

According to some embodiments, a touch screen controller that controls operations of the touch screen 320 may be embodied inside the application processor 100 or inside the display 310.

Figure 2B:
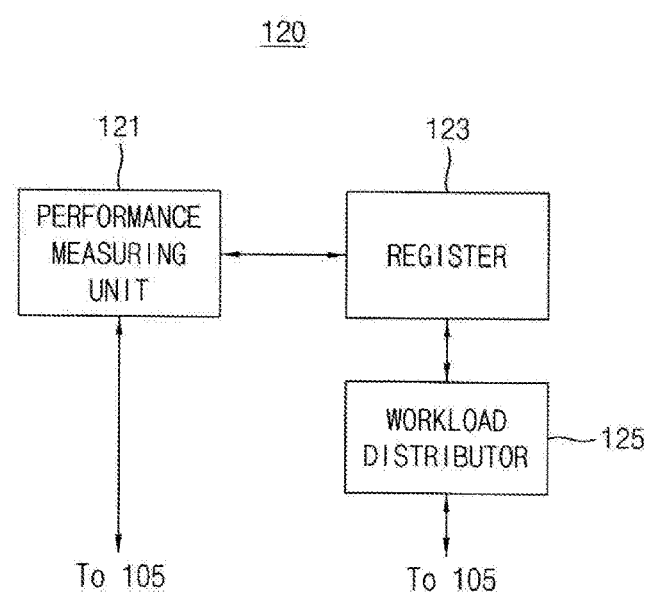
FIG. 2B is a block diagram of an example of a storage controller in an application processor of FIG. 2A according to exemplary embodiments.

According to exemplary embodiments, FIG. 2B is a block diagram of an example of a storage controller in an application processor of FIG. 2A.

Referring to FIG. 2B, according to exemplary embodiments, the storage controller 120 includes a performance measuring unit 121, a register 123 and a workload distributor 125.

According to exemplary embodiments, the performance measuring unit 121, when the external storage 400 is connected to the mobile device 10, measures a performance and a capacity of the external storage 400 using sequential and random data and stores the performance and the capacity in the register 123. In addition, the performance of the embedded storage 200 can be pre-stored in the register 123. The workload distributor 125 allocates workload to the embedded storage 200 and the external storage 400 based on a first performance of the embedded storage 200 and the external storage 400 to increase data processing speed.

Figure 3:
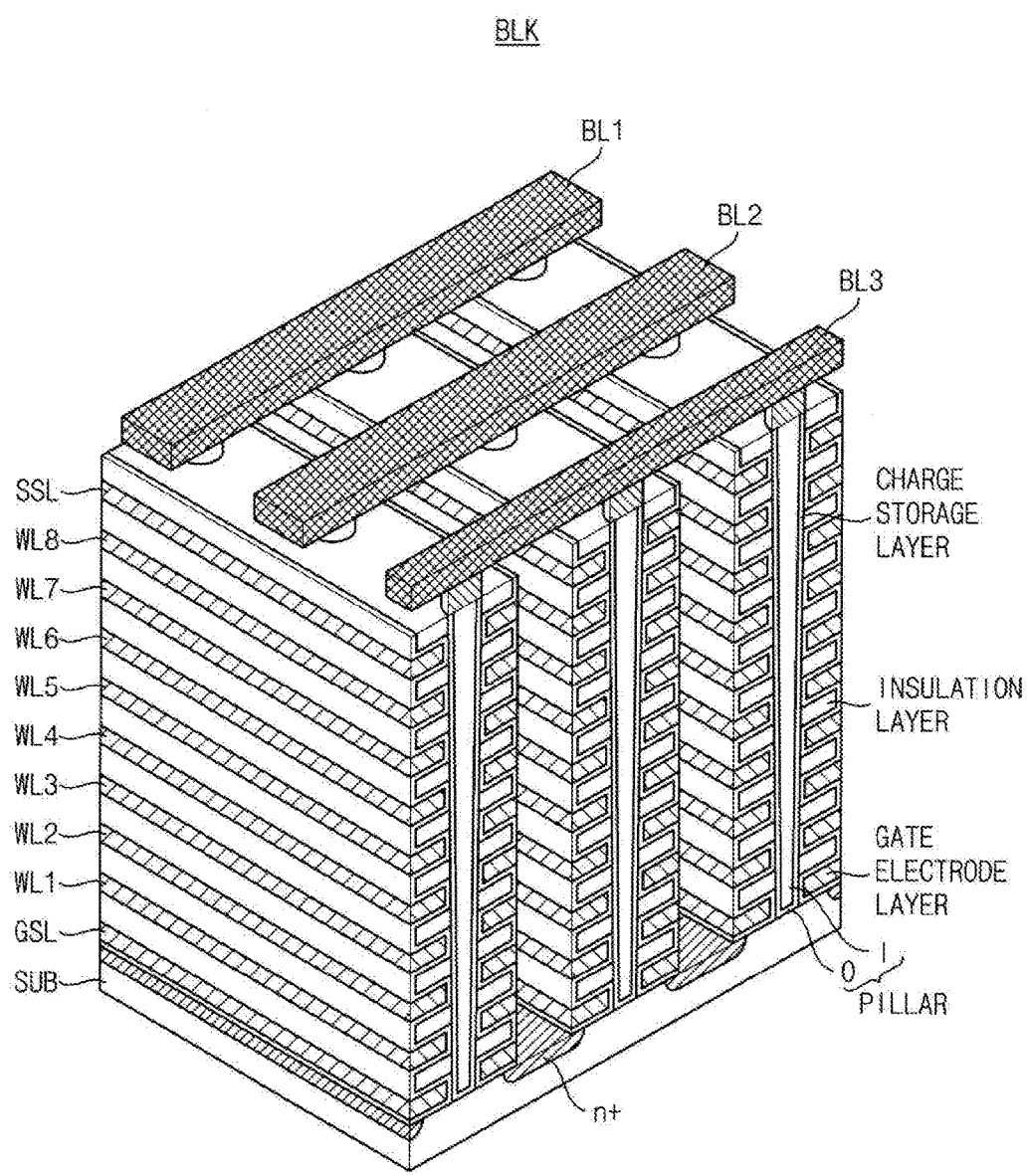
FIG. 3 is a perspective view of an example of a memory block of a memory cell array that may be included in an embedded storage or in an external storage in a mobile device of FIG. 1, which is implemented with a 3-D structure.

FIG. 3 is a perspective view of an example of a memory block of a memory cell array that is included in an embedded storage or in an external storage in the mobile device of FIG. 1, which is implemented with a 3-D structure.

Referring to FIG. 3, according to exemplary embodiments, a memory block BLK is formed in a direction perpendicular to a substrate SUB. An n+ doped region is formed in the substrate SUB. A gate electrode layer and an insulation layer are alternately deposited on the substrate SUB. In addition, a charge storage layer is formed between the gate electrode layer and the insulation layer.

According to exemplary embodiments, when the gate electrode layer and the insulation layer are vertically patterned, a V-shaped pillar is formed. The pillar penetrates the gate electrode layer and the insulation layer to be connected to the substrate SUB. The outer portion O of the pillar is formed with a channel semiconductor, and the inner portion I of the pillar is formed with an insulation material such as silicon oxide.

According to exemplary embodiments, the gate electrode layer is connected to a ground selection line GSL, a plurality of word lines WL1 to WL8, and a string selection line SSL. The pillar is connected to a plurality of bit lines BL1 to BL3.

Although FIG. 3 shows the memory block BLK having the ground selection line GSL, the string selection line SSL, eight wordlines WL1 to WL8, and three bitlines BL1 to BL3 as an example, embodiments are not limited thereto.

Figure 4:
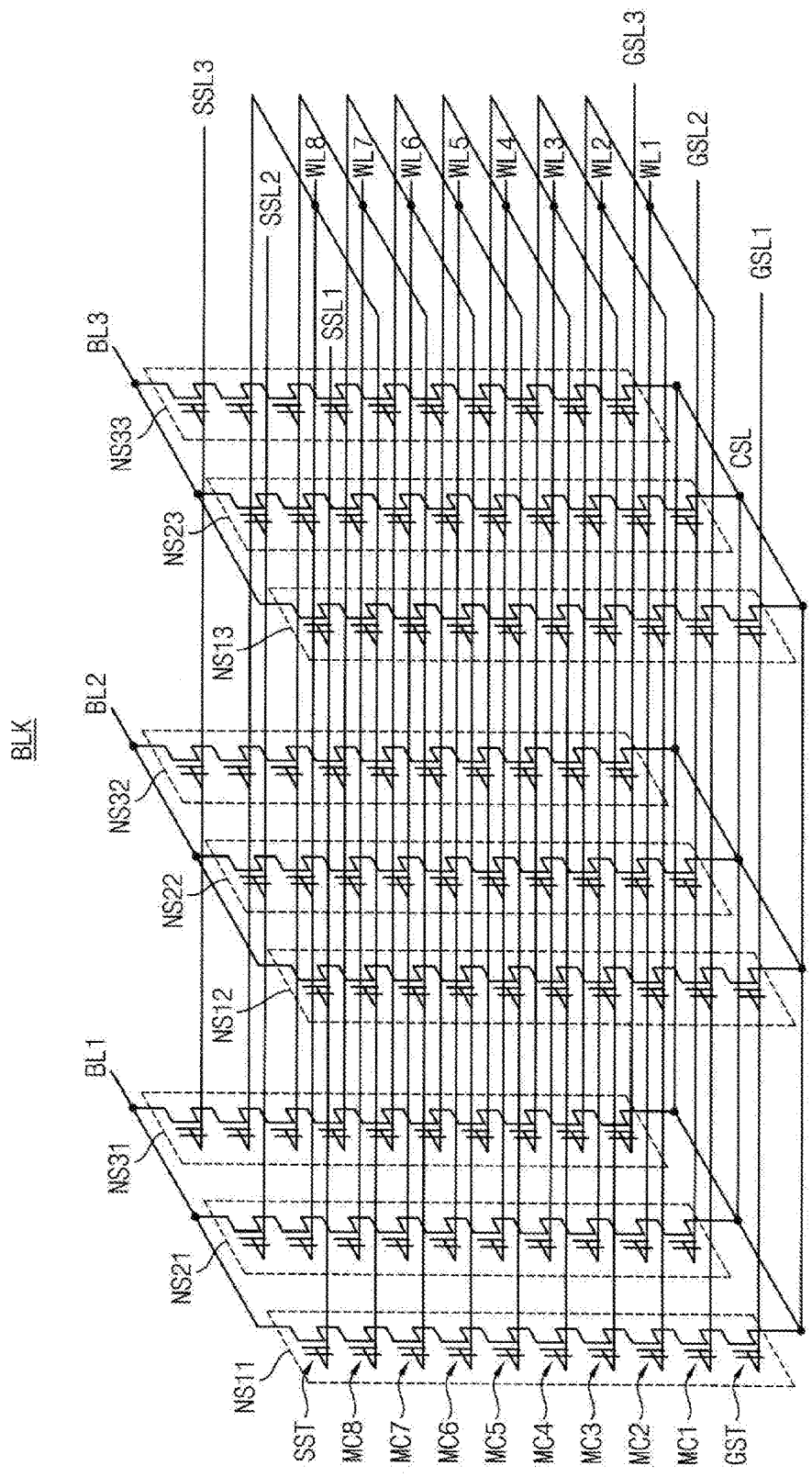
FIG. 4 is a circuit diagram of an equivalent circuit of a memory cell array of FIG. 3.

FIG. 4 is a circuit diagram of an equivalent circuit of the memory cell array of FIG. 3.

Referring to FIG. 4, according to exemplary embodiments, NAND strings NS11 to NS33 are connected between the bitlines BL1 to BL3 and a common source line CSL. Each NAND string, such as NS11, includes a string selection transistor SST, a plurality of memory cells MC1 to MC8, and a ground selection transistor GST.

According to exemplary embodiments, the string selection transistor SST is connected to string selection lines SSL1 to SSL3. The plurality of memory cells MC1 to MC8 are respectively connected to corresponding wordlines WL1 to WL8. The ground selection transistor GST is connected to ground selection lines GSL1 to GSL3. The string selection transistor SST is connected to the bit lines BL1 to BL3, and the ground selection transistor GST is connected to the common source line CSL.

According to exemplary embodiments, wordlines, such as WL1, with the same height are commonly connected and the ground selection lines GSL1 to GSL3 and the string selection lines SSL1 to SSL3 are separated. For example, when a physical page that includes memory cells connected to the first word line WL1 and included in the NAND strings NS11, NS12, and NS13 is programmed, the first word line WL1, the first string selection lines SSL1, and the first ground selection line GSL1 are selected.

Figure 5:
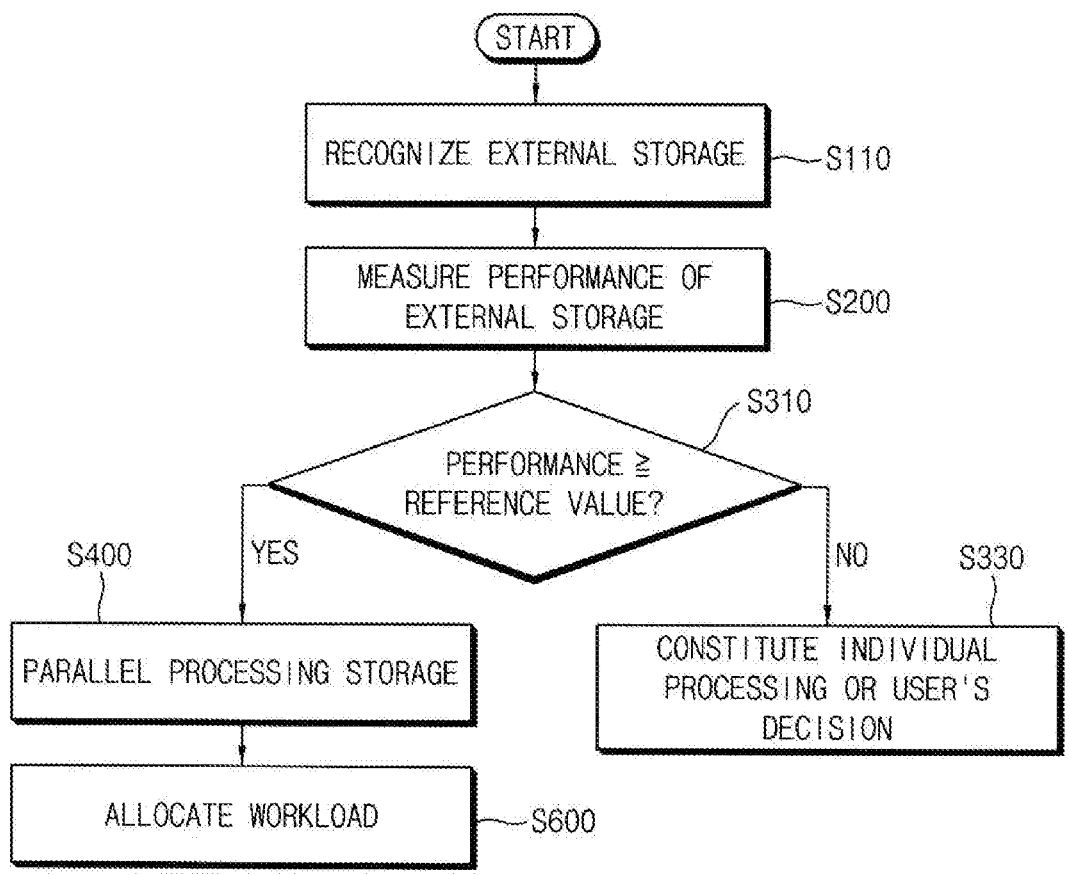
FIG. 5 is a flow chart of a method of operating a mobile device according to exemplary embodiments.

FIG. 5 is a flow chart of a method of operating a mobile device according to exemplary embodiments.

Referring to FIGS. 1 through 2B and 5, according to exemplary embodiments, in a method of operating a mobile device 10 that includes an embedded storage 200 with a first capacity, the application processor 100 recognizes that an external storage 400 is connected to the mobile device 10 (S110). When the external storage 400 is connected to the mobile device 10, the external storage interface 350 recognizes a connection of the external storage 400 and notifies the application processor 400 of the connection to the external storage 400 by a signal.

According to exemplary embodiments, the application processor 100 or the memory control module 110 measure a performance of the external storage 400 and store a performance value in the register 123 (S200). The application processor 100 or the memory control module 110 determines whether the performance of the external storage 400 is equal to or greater than a reference value by comparing the performance value of the external storage 400 with the reference value (S310).

According to exemplary embodiments, when the performance of the external storage 400 is equal to or greater than the reference value (YES in S310), the application processor 100 or the memory control module 110 constitutes the embedded storage 200 and the external storage 400 into one parallel processing storage (S400). When the performance of the external storage 400 is less than the reference value (NO in S310), the application processor 100 or the memory control module 110 constitutes the embedded storage 200 and the external storage 400 into individual processing storages or prompts the user through the display 310 to select whether to constitute the embedded storage 200 and the external storage 400 into a parallel processing storage (S330).

According to exemplary embodiments, when the embedded storage 200 and the external storage 400 are constituted into one parallel processing storage, the workload distributor 125 allocates workload to the embedded storage 200 and the external storage 400 based on a first performance of the embedded storage 200 and a second performance of the external storage 400 based on a ratio of the first performance and the second performance (S600).

According to exemplary embodiments, a second capacity of the external storage 400 is equal to or greater than the first capacity of the embedded storage 200.

Figure 6:
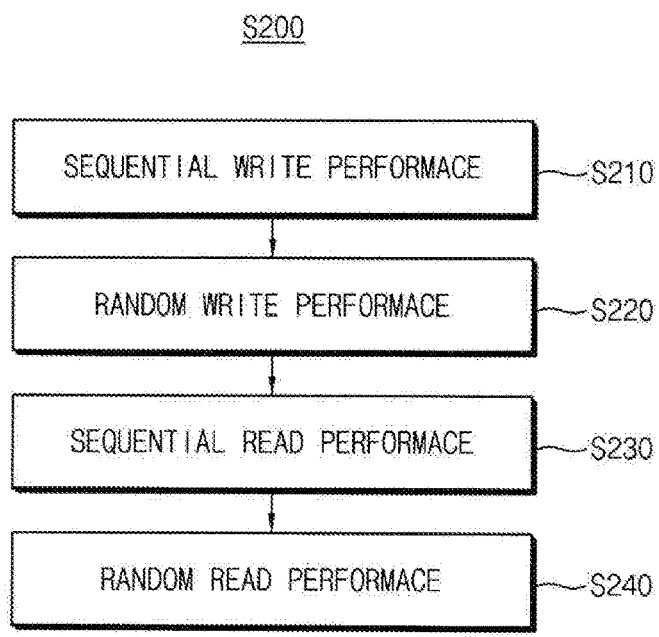
FIG. 6 is a flowchart of a method of measuring performance of an external storage according to exemplary embodiments.

FIG. 6 is a flowchart of a method of measuring a performance of the external storage according to exemplary embodiments.

Referring to FIGS. 1 through 2B and 6, according to exemplary embodiments, to measure the performance of the external storage 400, the performance measuring unit 121 writes sequential data to the external storage 400 to measure a sequential write performance of the external storage 400 (S210), writes random data to the external storage 400 to measure a random write performance of the external storage 400 (S220), reads sequential data from the external storage 400 to measure a sequential read performance of the external storage 400 (S230), and reads random data from the external storage 400 to measure a random read performance of the external storage 400 (S240).

According to some embodiments, steps (S220 and S240) can be omitted or given little weight in measuring the performance of the external storage 400.

For example, suppose a write performance of the embedded storage 200 is 100 MB/sec and a write performance of the external storage 400 is 50 MB/sec. The performance measuring unit 121 stores measured performances of the external storage 400 in the register 123.

According to exemplary embodiments, when 200 MB data is to be processed based on a first performance of the embedded storage 200 and a second performance of the external storage 400, the workload distributor 125 allocate 150 MB to the embedded storage 200 and 50 MB to the external storage 400. Therefore, 200 MB data is written in a 1.5 second.

Figure 7:
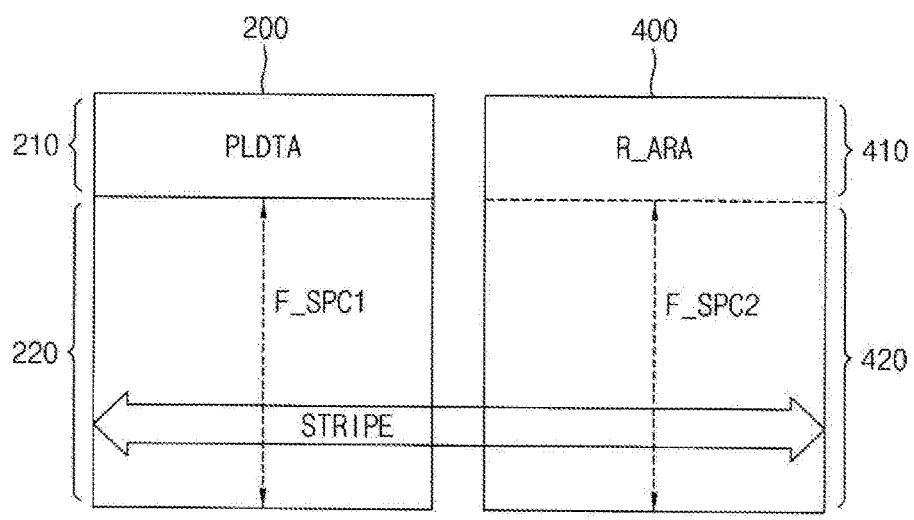
FIG. 7 illustrates an embedded storage and an external storage in a mobile device of FIG. 1 according to exemplary embodiments.

FIG. 7 illustrates an embedded storage and an external storage in a mobile device of FIG. 1 according to exemplary embodiments.

Referring to FIG. 7, according to exemplary embodiments, the embedded storage 200 includes a default area 210 and a first free area F_SPC1 220. The default area 210 stores data PLDTA for basic operations of the mobile device 10, such as a boot loader, an operating system (OS) image, application programs, etc., and the first free area 220 stores user data, such as game programs, etc. The sum of the capacity of the default area 210 and the capacity of the first free area 220 corresponds to the first capacity of the embedded storage 200.

According to exemplary embodiments, the external storage 400 includes a second free area F_SPC2 420 and a remaining area 410. The second free area 420 has a capacity substantially the same as the capacity of the first free area 220. The sum of the capacity of the second free area 420 and the capacity of the remaining area 410 corresponds to the second capacity of the external storage 400. The first free area 220 has a third capacity and the second free area 420 has a fourth capacity.

According to exemplary embodiments, when the performance of the external storage 400 connected to the mobile device 10 is equal to or greater than the reference value, the storage controller 120 constitutes the first free area 220 and the second free area 420 into one parallel processing storage, such as a RAID, and stores application program data or user data in parallel in the first free area 220 and the second free area 420. The storage controller 120 constitutes the first free area 220 and the second free area 420 into a stripe type RAID (random array of independent disks).

Figure 8:
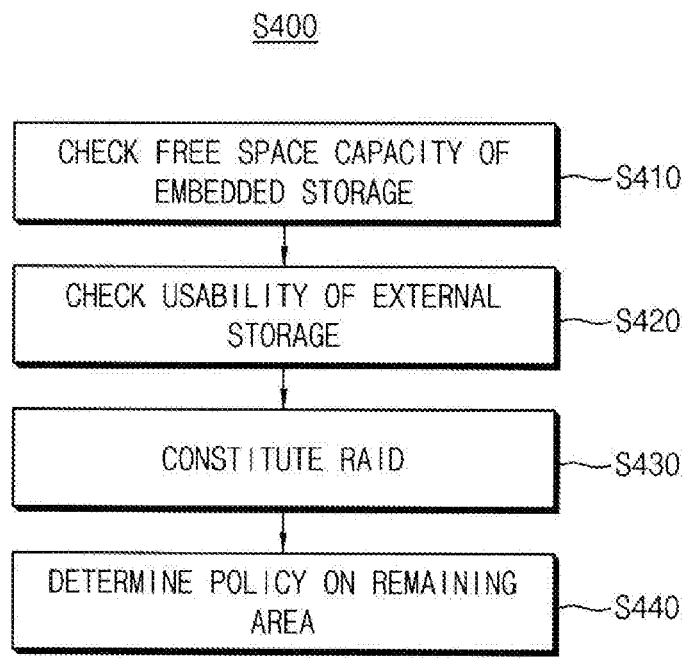
FIG. 8 is a flow chart of a method of constituting an embedded storage and an external storage into one parallel processing storage in a method of FIG. 5.

FIG. 8 is a flow chart of a method of constituting an embedded storage and an external storage into one parallel processing storage in a method of FIG. 5.

Referring to FIGS. 1 through 2B, 5, 7 and 8, according to exemplary embodiments, the memory control module 110 checks a capacity of the first free area 220 in the embedded storage 200, but not the capacity of the default area 210 in the embedded storage 200 (S410). The memory control module 110 checks a usability, i.e., capacity, of the external storage 400 (S420). When the capacity of the external storage 400 is greater than the capacity of the first free area 220, it may be beneficial to constitute a RAID.

According to exemplary embodiments, when the capacity of the external storage 400 is greater than the capacity of the first free area 220, the storage controller 120 constitutes the first free area 220 and the second free area 420 into a first stripe type RAID (S430). When the first RAID is consti-
tuted, the memory control module 110 determines a usage policy of the remaining area 410 of the external storage 400 (S500).

Figure 9:
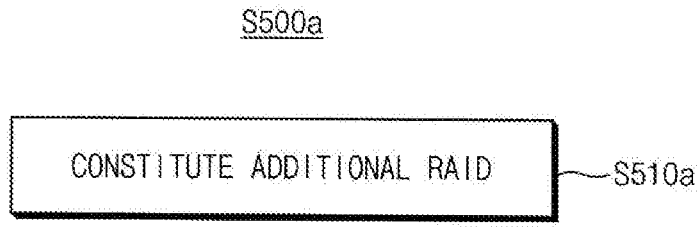
FIG. 9 is a flowchart of an example of a step of determining a usage policy of a remaining area.
Figure 10:
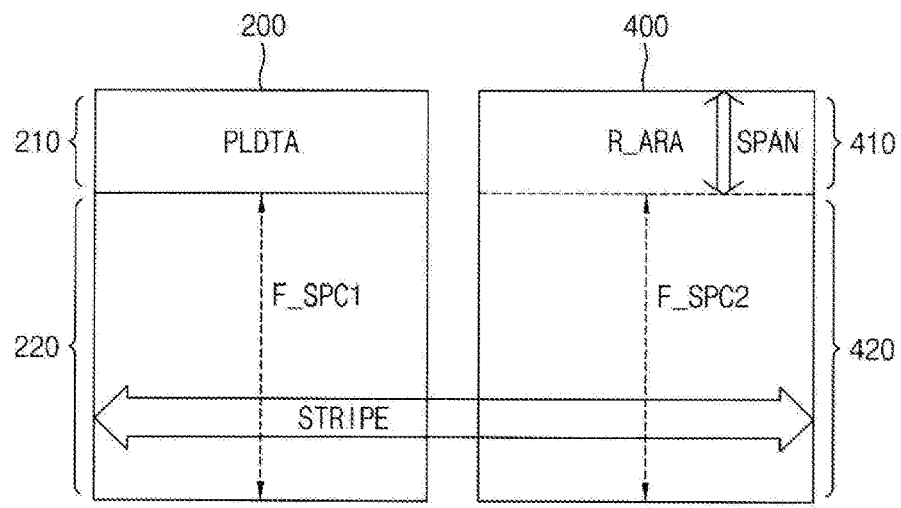
FIG. 10 illustrates an embedded storage and an external storage according to an embodiment of FIG. 9.

FIG. 9 is a flowchart of an example of a step of determining a usage policy of a remaining area. FIG. 10 illustrates an embedded storage and an external storage according to an embodiment of FIG. 9.

Referring to FIGS. 7, 9 and 10, to determine the usage policy of the remaining area 410 (S500a), the memory control module 110 determines to constitute the remaining area 410 into a second, span type RAID, different from the first RAID (S510).

Figure 11:
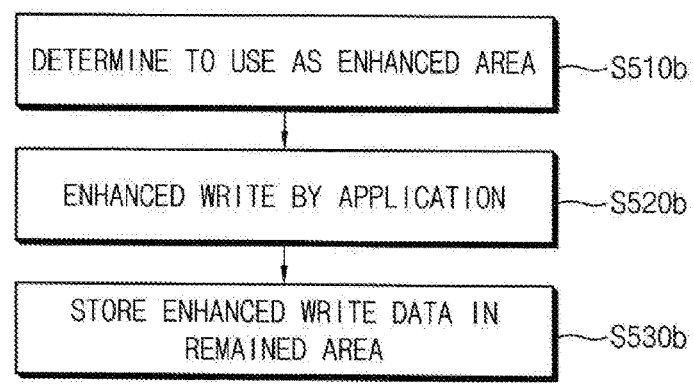
FIG. 11 is a flowchart of another example of a step of determining a usage policy of a remaining area.
Figure 12:
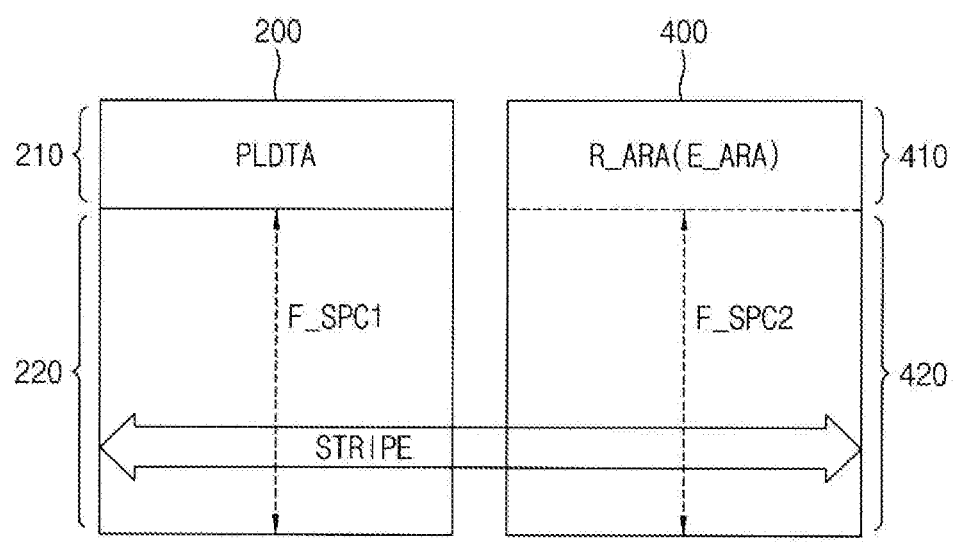
FIG. 12 illustrates an embedded storage and an external storage according to an embodiment of FIG. 11.

FIG. 11 is a flowchart of another example of a step of determining a usage policy of a remaining area. FIG. 12 illustrates an embedded storage and an external storage according to an embodiment of FIG. 11.

Referring to FIGS. 7, 11 and 12, according to exemplary embodiments, to determine the usage policy of the remaining area 410 (S500b), the memory control module 110 determines that the remaining area 410 is a spare area that replaces an enhanced area (E_ARA) in which LSB (least significant bit) programs are executed (S510b). When an enhanced write data, such as single level cell mode data, is generated by at least one of the applications (S520b), the memory control module 110 stores the enhanced write data in the remaining area 410 (S530b). For an LSB program, there is little performance difference between the embedded storage 200 and the external storage 400, and an LSB program can use the external storage 400 instead of the embedded storage 200.

According to exemplary embodiments, when an LSB program is executed in the embedded storage 200 by a request of another application program, the remaining area 410 can replace the enhanced area of the embedded storage 200. Therefore, the user can use an enhanced area as a free area.

Figure 13:
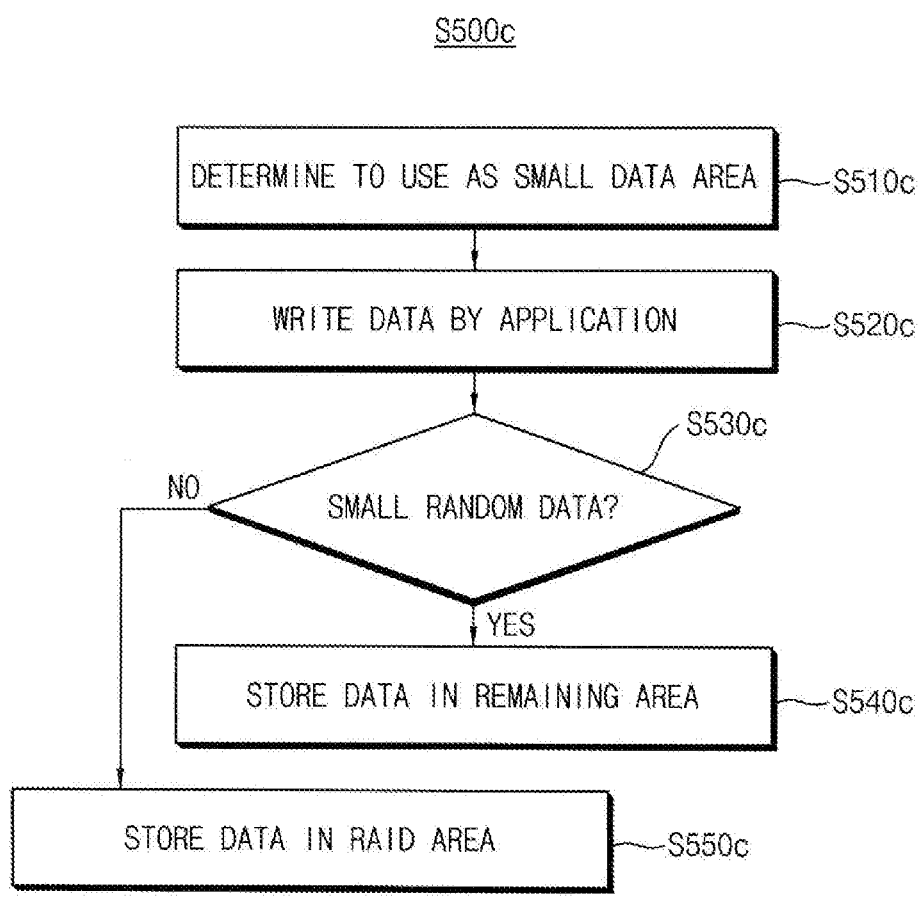
FIG. 13 is a flowchart of another example of a step of determining a usage policy of a remaining area.

FIG. 13 is a flowchart of another example of a step of determining a usage policy of a remaining area.

Referring to FIGS. 7 and 13, according to exemplary embodiments, to determine the usage policy of the remaining area 410 (S500c), the memory control module 110 determines to use the remaining area 410 as a buffer area for storing random data generated by an application program (S510c). Data is generated by an application program (S520c), the memory control module 110 determines whether the data is small random data by determining whether the size of the data is less than a threshold value (S530c). If the data is a small random data (YES in S530c), the memory control module 110 stores the data in the remaining area 410 (S540c). If the data is not a small random data (NO in S530c), the memory control module 110 stores the data in the RAID areas (220 and 420) (S550c). The control module 110 or the application processor 100 may determine sequentially or simultaneously a size and a randomness of the data generated by the application program based on comparing the size of the data with the threshold value and an attribute of an address designating an area in which the data is to be stored. For example, the size of the random small date is less than the size of the sequential small data.

According to exemplary embodiments, the control module 110 determines whether the data is small random data based a size of the data and on an attribute of an address that designates an area in which the data is to be stored. If the address is consecutive, the data is data of a sequential write mode. If the address is random, the data is data of a random write mode. The control module 110 or the application processor 100 determines whether the data is small random data based on the size of the data and on the attribute of the address designating an area in which the data is to be stored.

Figure 14:
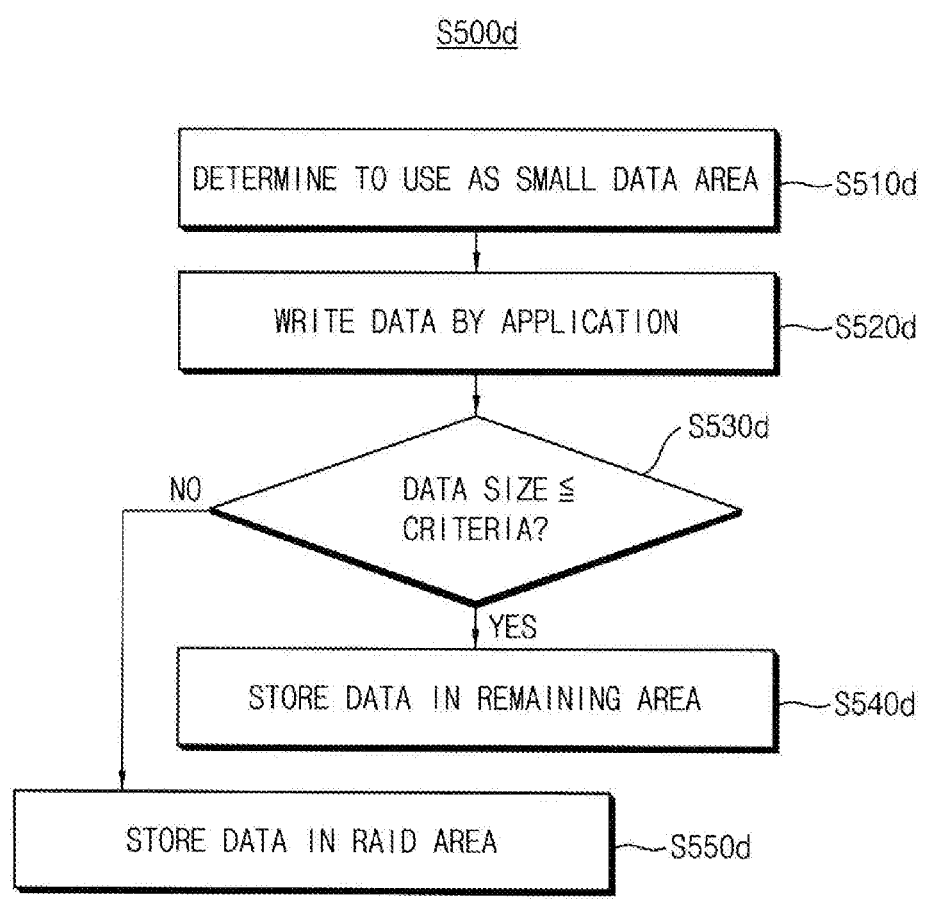
FIG. 14 is a flowchart of another example of a step of determining a usage policy of a remaining area.

FIG. 14 is a flowchart of another example of a step of determining a usage policy of a remaining area.

Referring to FIGS. 7 and 14, according to exemplary embodiments, to determine the usage policy of the remaining area 410 (S500d), the memory control module 110 determine to use the remaining area 410 as a small data area for storing small data generated by an application program (S510d). Data is generated by an application program (S520d), the memory control module 110 determines whether the data is small data by determining whether the size of the data is less than a threshold value (S530d). If the data is small data (YES in S530d), the memory control module 110 stores the data in the remaining area 410 (S540d). If the data is not small data (NO in S530d), the memory control module 110 stores the data in the RAID area (220 and 420) (S550d).

Although a probability of writing data in the remaining area 410 is less than a probability of writing data in the RAID area 220 and 420, a speed of storing data increases when small data is stored in the remaining area 410. For example, when small data such as an MP3 file or a photo is preferentially stored in the remaining area 410 and big data such as a movie or a game is stored in the RAID area 220 and 420, the user may be provided with an improved user experience.

Figure 15:
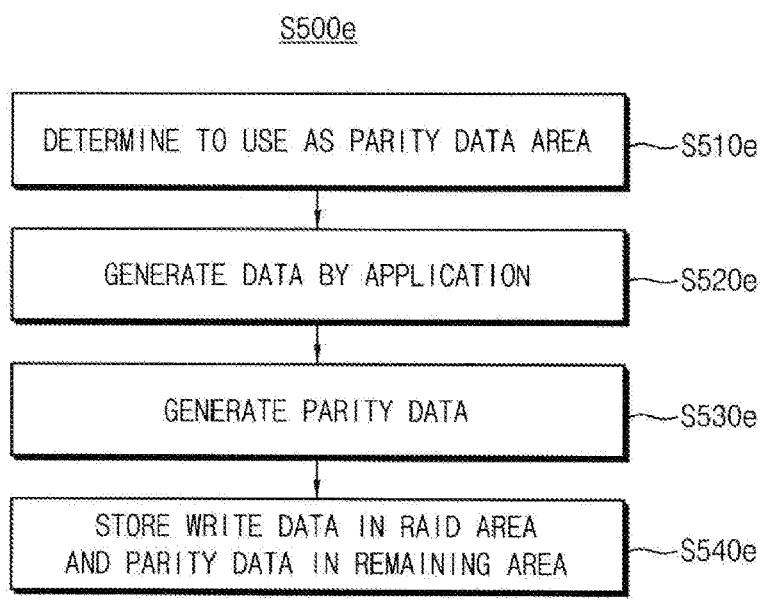
FIG. 15 is a flowchart of another example of a step of determining a usage policy of a remaining area.

FIG. 15 is a flowchart of another example of a step of determining a usage policy of a remaining area.

Referring to FIGS. 7 and 15, according to exemplary embodiments, to determine the usage policy of the remaining area 410 (S500e), the memory control module 110 determines to use the remaining area 410 as a parity area (S510e). Data is generated by an application program (S520e), and the memory control module 110 generates parity data based on the data (S530e). To generate the parity data, the memory control module 110 uses an error correction code (ECC). The memory control module 110 stores the generated data in the RAID area 220 and 420 and the parity data in the remaining area 410 (S540e).

According to exemplary embodiments, storing the parity data in the remaining area 410 is performed to monitor the correctness of the data generated by an application program. When data is read, errors in the data can be detected and corrected by reading the parity data from the remaining area 410.

Figure 16:
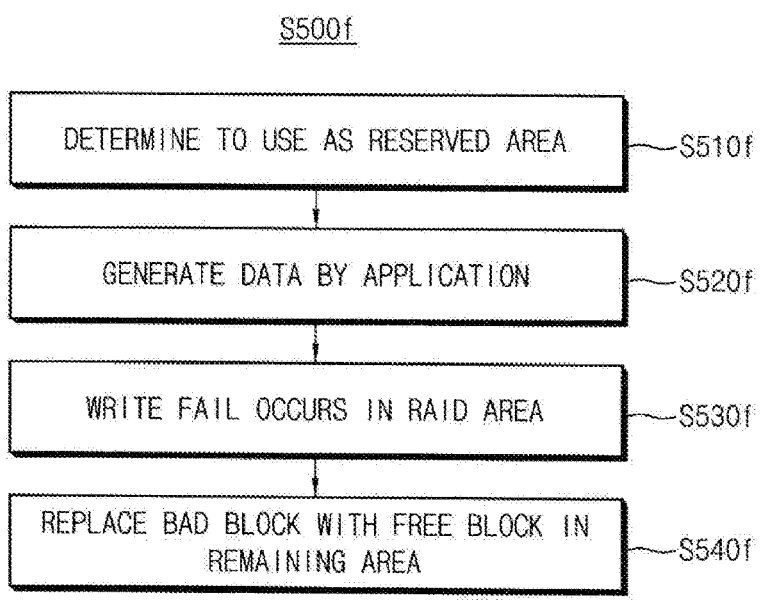
FIG. 16 is a flowchart of another example of a step of determining a usage policy of a remaining area.

FIG. 16 is a flowchart of another example of a step of determining a usage policy of a remaining area.

Referring to FIGS. 7 and 16, according to exemplary embodiments, to determine the usage policy of the remaining area 410 (S500f), the memory control module 110 determines to use the remaining area 410 as a reserve area for recovering at least one bad block of the RAID area 220 and 420 (S510f). Data is generated by an application programs (S520f), and a write operation fails for a bad block while writing the data in the RAID area 220 and 420 (S530f). The memory control module 110 replaces the bad block with a free block in the remaining area 410 (S540f).

Figure 17:
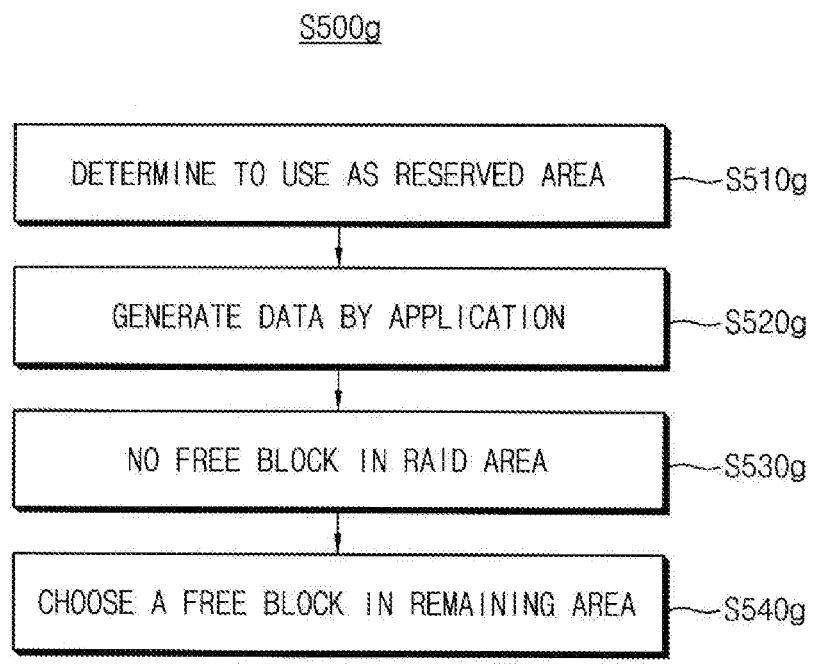
FIG. 17 is a flowchart of another example of a step of determining a usage policy of a remaining area.

FIG. 17 is a flowchart of another example of a step of determining a usage policy of a remaining area.

Referring to FIGS. 7 and 17, according to exemplary embodiments, to determine a usage policy of the remaining area 410 (S500g), the memory control module 110 determines to use the remaining area 410 as a reserve area that increases s number of free blocks in the RAID area 220 and 420 (S510g). Data is generated by an application program (S520g), and there is no free block in the RAID area 220 and 420 while writing the data in the RAID area 220 and 420 (S530g). The memory control module 110 selects a free block in the remaining area 410 and writes the data in the selected free block (S540g).

Figure 18:
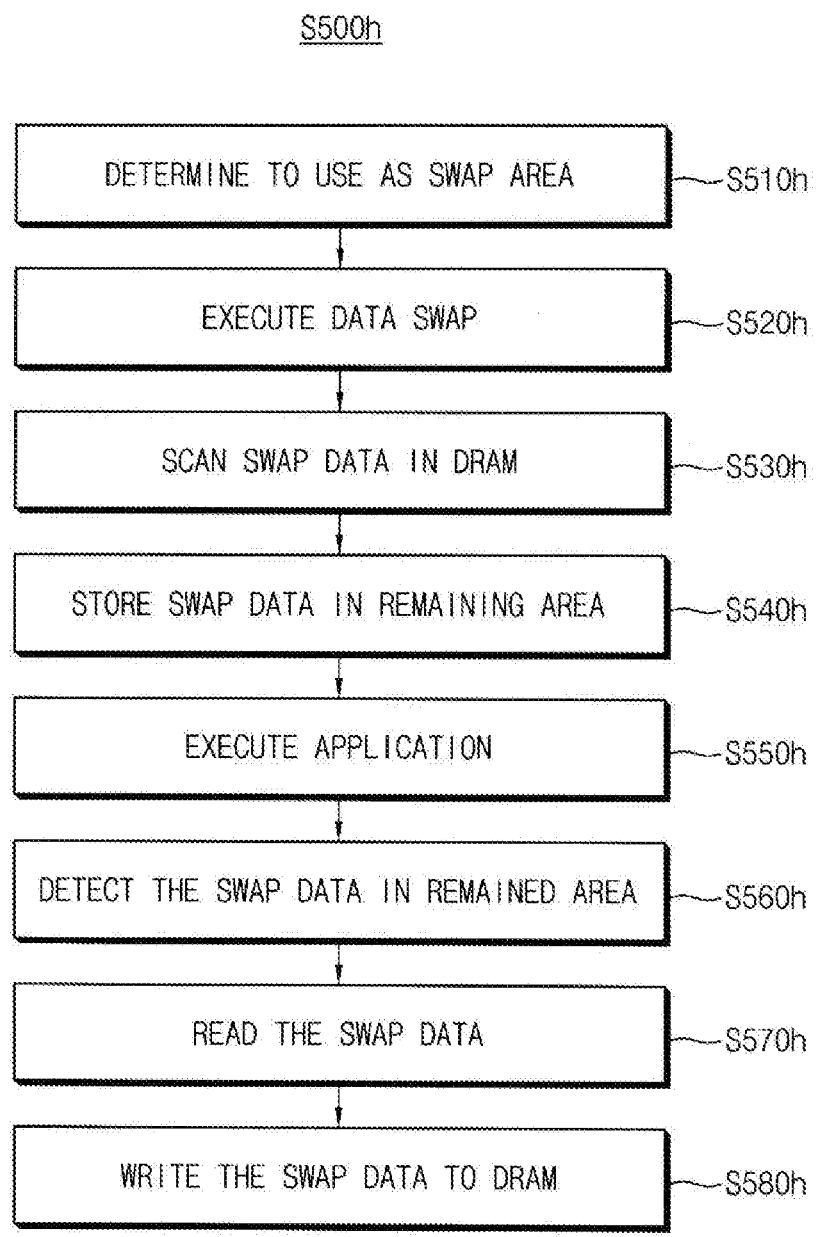
FIG. 18 is a flowchart of another example of a step of determining a usage policy of a remaining area.
Figure 19:
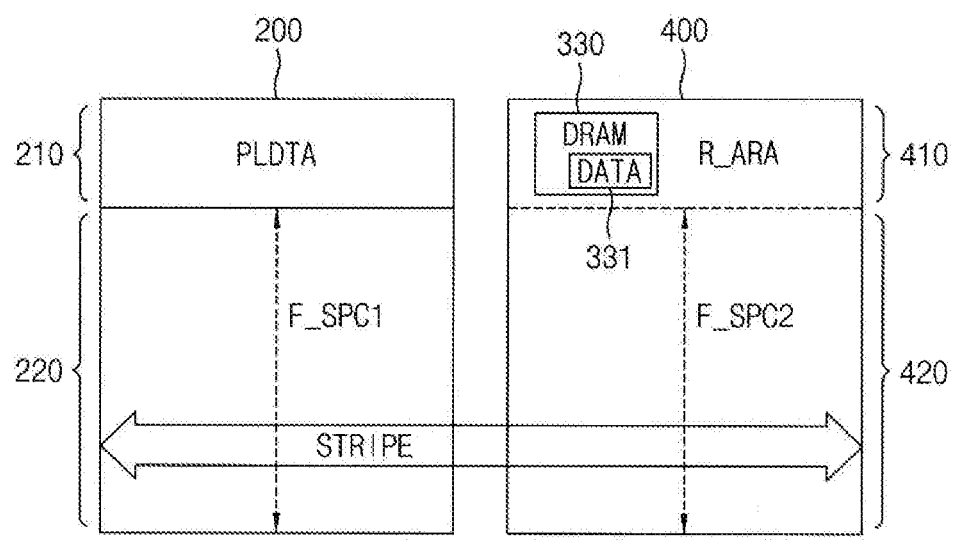
FIG. 19 illustrates an embedded storage and an external storage of an embodiment of FIG. 18.

FIG. 18 is a flowchart of another example of a step of determining a usage policy of a remaining area. FIG. 19 illustrates an embedded storage and an external storage of an embodiment of FIG. 18.

Referring to FIGS. 7, 18 and 19, according to exemplary embodiments, to determine a usage policy of the remaining area 410 (S500h), the memory control module 110 determines to use the remaining area 410 as a data swap memory region for swapping driving data stored in the volatile memory device 330 (S510h). The application processor 100 determines to swap the driving data (S520h). The memory control module 110 scans swap data 331 in the volatile memory device 330 (S530h). The memory control module 110 moves the swap data 331 from the volatile memory device 330 to the remaining area 410 and stores the swap data 331 in the remaining area 410 (S540h). The application processor 100 executes an application program (S550h). The application processor 100 detects the swap data 331 in the remaining area 410 (S560h). The memory control module 110 reads the swap data 331 from the remaining area 410 (S570h) and writes the swap data 331 to the volatile memory device 330 (S580h).

According to exemplary embodiments, when a size of an application program is large, or when an application program is frequently executed, data of the volatile memory device 330 is stored in the RAID area 220 and 420 for faster execution. A swap operation can be used to load the data from the volatile memory device 330 when the frequently executed application program is re-executed for increasing execution speed. When the capacity of the remaining area 410 is sufficiently large and the data of the volatile memory device 330 is swapped to the remaining area 410, the swap operation can be performed without reducing the capacity of the RAID area 220 and 420.

Figure 20:
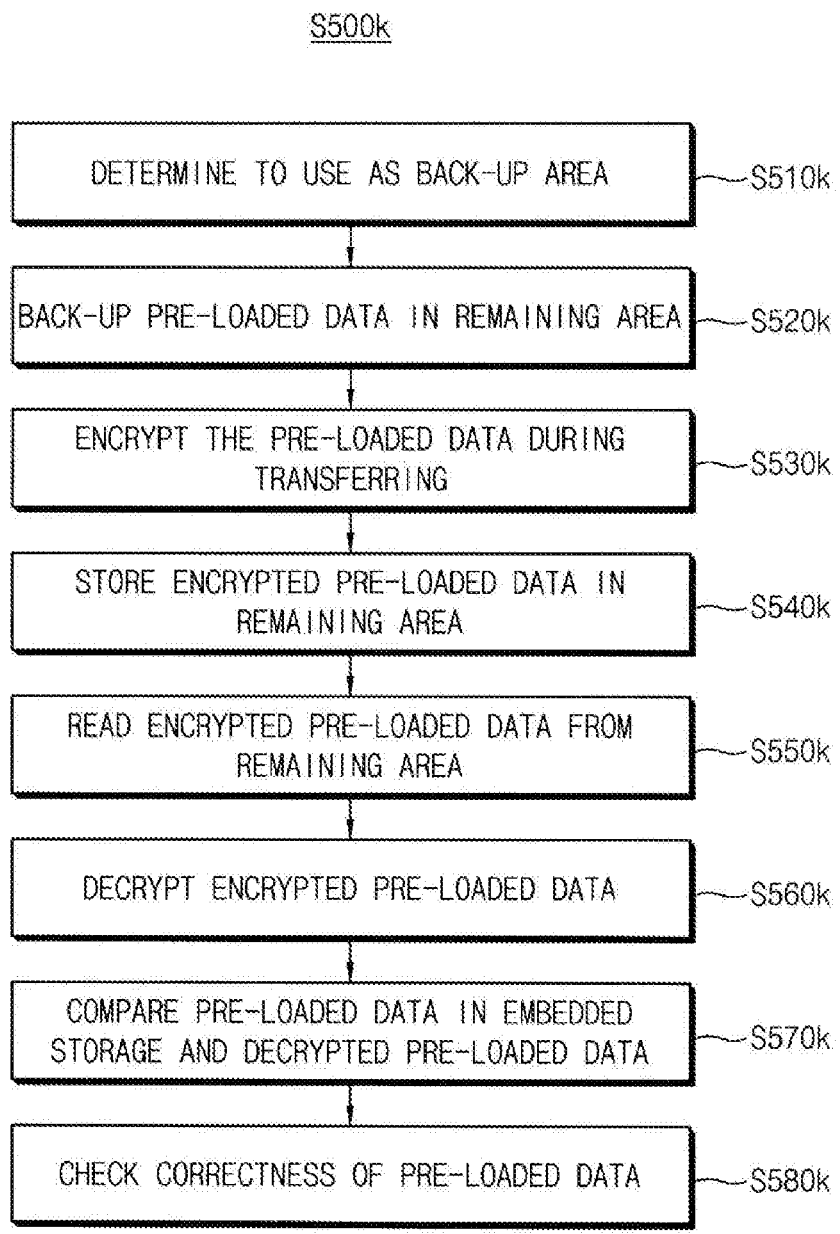
FIG. 20 is a flowchart of another example of a step of determining a usage policy of a remaining area.
Figure 21:
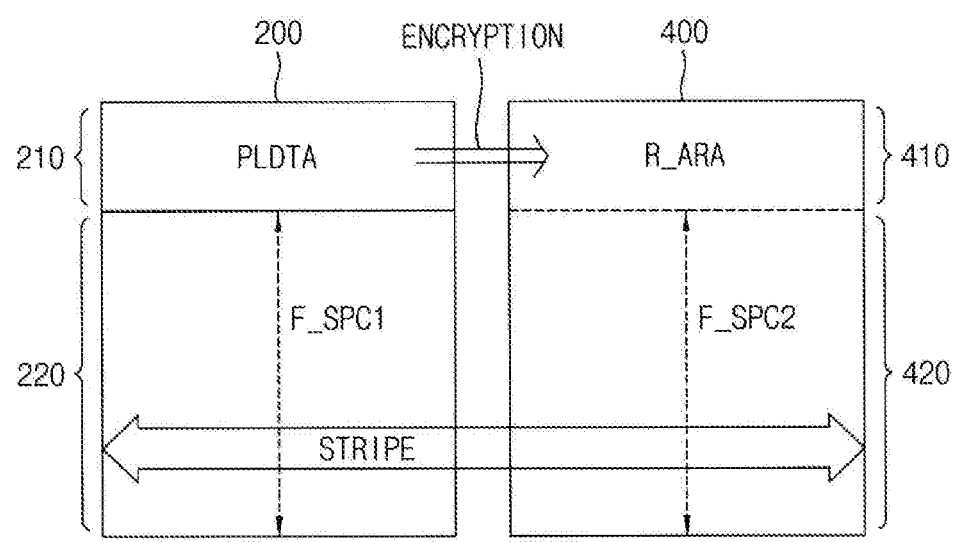
FIG. 21 illustrates an embedded storage and an external storage of an embodiment of FIG. 20.

FIG. 20 is a flowchart of another example of a step of determining a usage policy of a remaining area. FIG. 21 illustrates an embedded storage and an external storage of an embodiment of FIG. 20.

Referring to FIGS. 7, 20 and 21, according to exemplary embodiments, to determine a usage policy of the remaining area 410 (S500k), the memory control module 110 determines to use the remaining area 410 as a back-up area in which pre-loaded data, such as data stored in the default area 210, is encrypted and stored (S510k). The application processor 100 determines to back-up the default data in the remaining area 410 (SS520k). Some of data and application programs stored in the default area 210 are encrypted and stored in the remaining area 410. The memory control module 110 encrypts the default data while transferring the default data from the default area 210 to the remaining area 410 (S530k). The memory control module 110 stores the encrypted default data in the remaining area 410 (S540k). The memory control module 110 reads the encrypted default data from the remaining area 410 (S550k), and decrypts the encrypted default data (S560k). The application processor 100 compares the default data stored in the default area 210 with the decrypted default data (S570k), and checks the correctness of the default data stored in the default area 210 (S580k). The memory control module 110 may use a security code.

Figure 22:
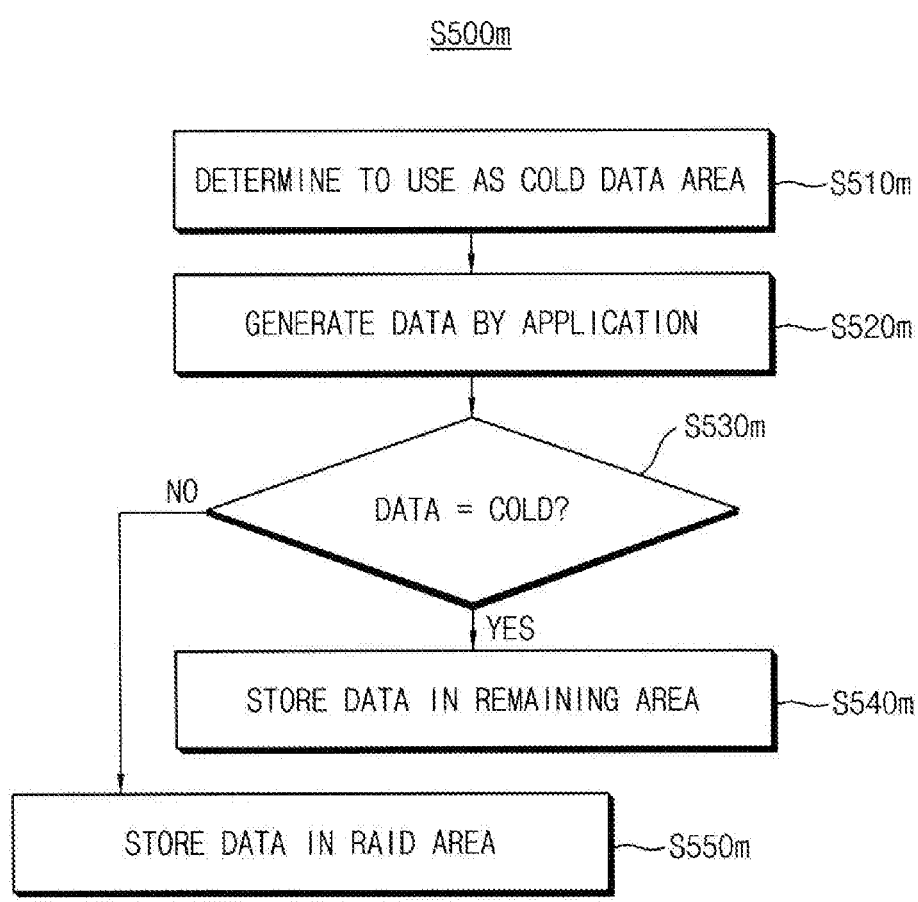
FIG. 22 is a flowchart of another example of a step of determining a usage policy of a remaining area.

FIG. 22 is a flowchart of another example of a step of determining a usage policy of a remaining area.

Referring to FIGS. 7 and 22, according to exemplary embodiments, to determine a usage policy of the remaining area 410 (S500*m*), the memory control module 110 determines to use the remaining area 410 as a cold data are for storing cold data generated by an application program (510*m*). Cold data has an access frequency that is less than a reference frequency. Data is generated by the application program (S520*m*), and the memory control module 110 determines whether the data generated by the application programs is cold (S530*m*). If the generated data is cold (YES in S530*m*), the memory control module 110 stores the data in the remaining area 410 (S540*m*). If the generated data is not cold (NO in S530*m*), the memory control module 110 stores the data in the RAID area (220 and 420) (S550*m*).

According to exemplary embodiments, if data stored in the RAID area 220 and 420 becomes cold data, the memory control module 110 moves the cold data from the RAID area 220 and 420 to the remaining area 410.

According to a method of operating a mobile device and a mobile device 10, when the performance of the external storage 400 connected to the mobile device 10 is equal to or greater than a reference value, a RAID is formed from a portion of the embedded storage 200 and a portion of the external storage 400, and data processing speed can be increased. In addition, another a portion of the external storage 400 may have various uses according to a usage policy, and thus the usability of the external storage 400 can be increased.

Figure 23A:
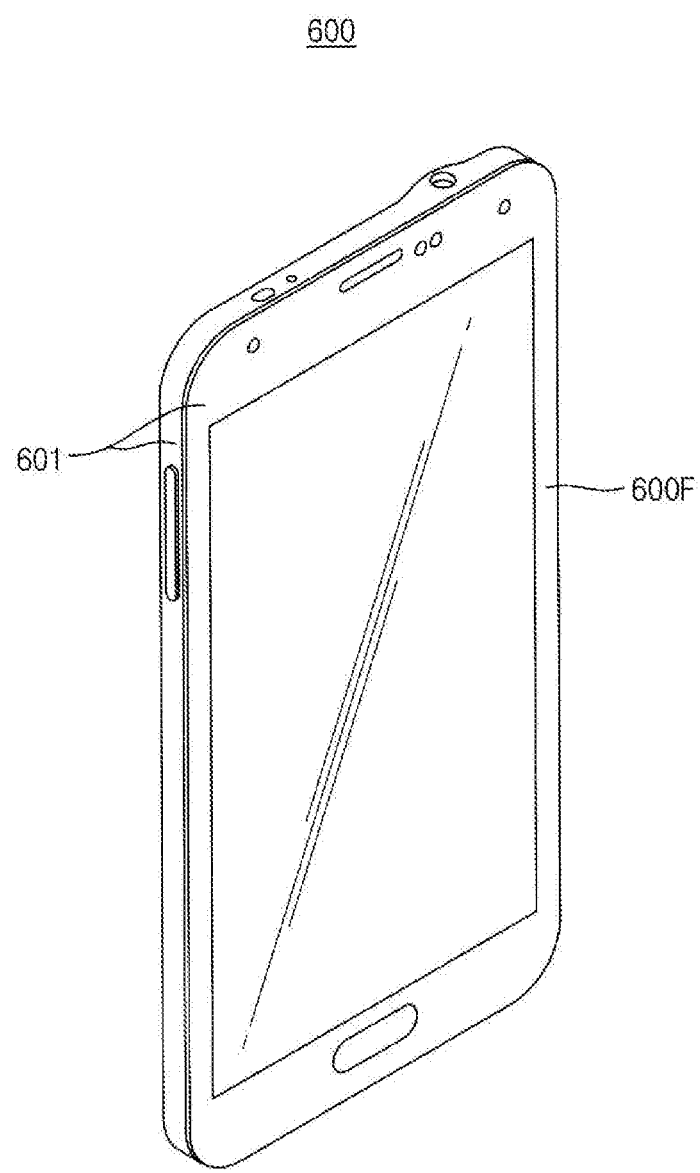
FIG. 23A is a perspective view of a mobile device according to exemplary embodiments.

FIG. 23A is a perspective view of a mobile device according to exemplary embodiments.

Referring to FIG. 23A, according to exemplary embodiments, a mobile device 600 incorporates the mobile device 10 of FIG. 1. For example, a front portion 600F of the mobile device 600 has an appearance or shape formed by a casing frame 601 that covers an inner main board. In some embodiments, the casing frame 601 exposes a display device to the outside. In addition, the mobile device 600 may include a camera, a receiver, a keypad, etc., in an upper or lower portion of the display device. The camera can be used to acquire a video sequence or an image of a user. The receiver can output sound upon a voice call or the playback of a multimedia file. The keypad includes, for example, a call button, a search button, etc. Further, in some embodiments, a volume control button, a hot key for operating the camera, etc., are installed on a side of the mobile device 600.

Figure 23B:
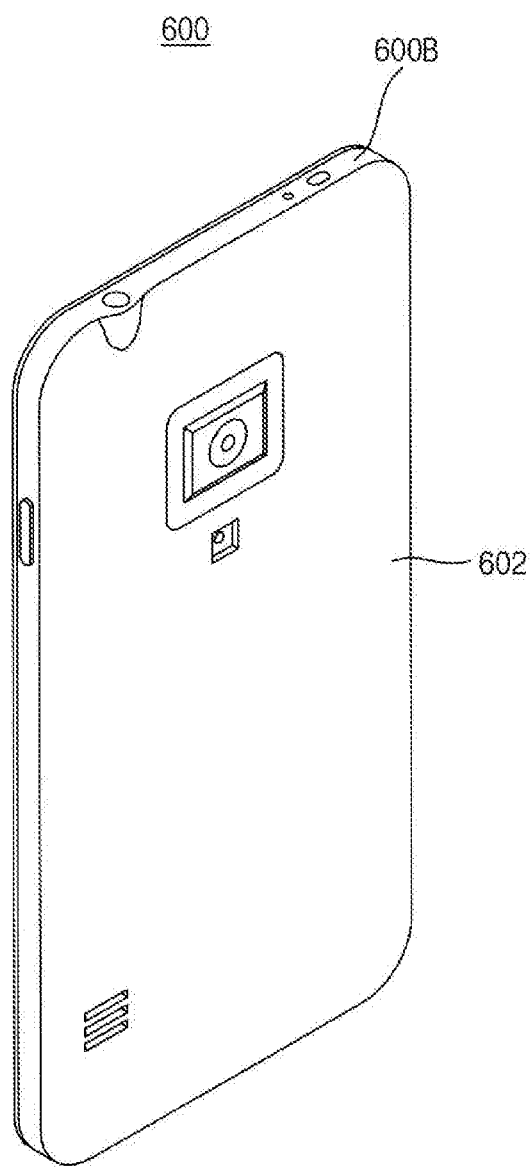
FIG. 23B is a rear perspective view of a mobile device of FIG. 23A.

FIG. 23B is a rear perspective view of a mobile device of FIG. 23A.

Referring to FIG. 23B, according to exemplary embodiments, a cover 602 covers the casing frame 601 in a rear portion 600B of the mobile device 600. In some embodiments, the cover 602 substantially or entirely covers the rear portion 600B of the mobile device 600 so that, for example, a battery pack, an attachable card, etc., which may be mounted on the mobile device 600, are not exposed. In some embodiments, the camera and a lighting device are installed in the rear portion 600B of the mobile device 600. The camera and the lighting device may be exposed without being covered by the cover 602.

Figure 23C:
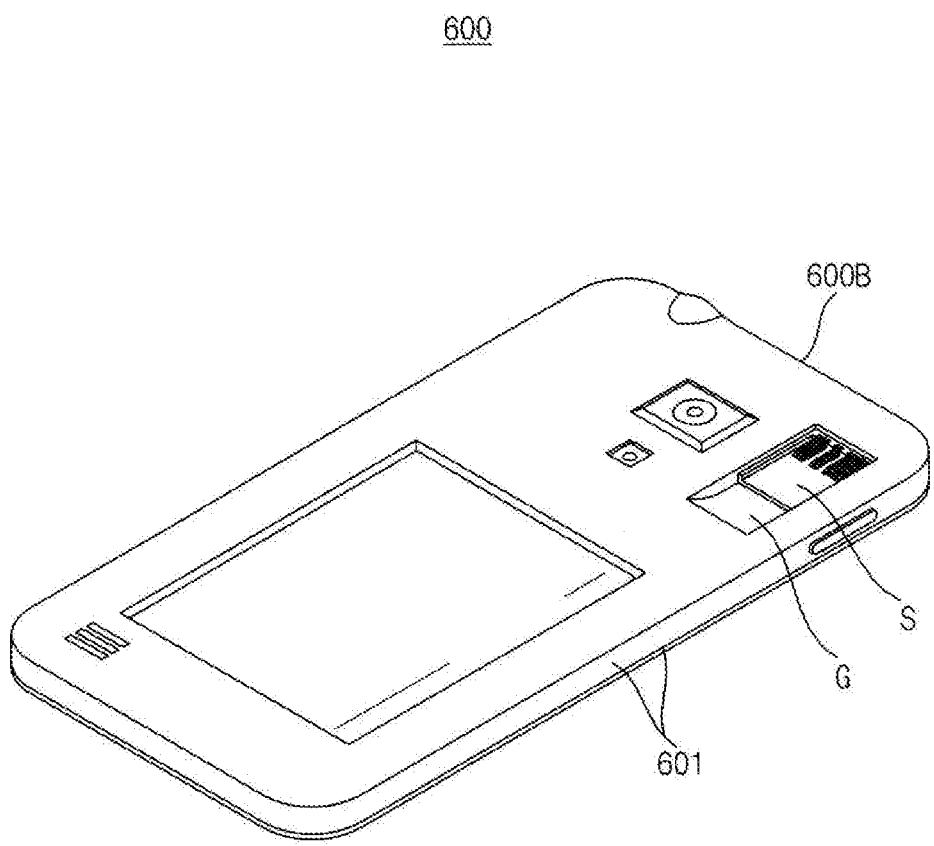
FIG. 23C is a rear perspective view of an exemplary mobile device of FIG. 23B from which the cover is removed.

FIG. 23C is a rear perspective view of an exemplary mobile device of FIG. 23B from which the cover is removed.

Referring to FIG. 23C, according to exemplary embodiments, the casing frame 601, which covers the inner main board or the like, is exposed from the rear portion 600B of the mobile device 600 from which the cover 602 has been removed. In some embodiments, an accommodating groove G and a card socket device S in which an attachable card can be inserted are disposed in the casing frame 601, and the card socket device S can be accommodated in the accommodating groove G.

Although the card socket device S and the accommodating groove G are illustrated as being disposed in an upper right portion of the rear portion 600B of the mobile device 600, exemplary embodiments are not limited thereto. In some exemplary embodiments, the mobile device 600 includes a battery-pack accommodating groove that can accommodate a battery pack. For example, the card socket device S and the accommodating groove G can be formed in a bottom surface of the battery-pack accommodating groove.

Although one card socket device S and one accommodating groove G are illustrated in FIG. 23C, exemplary embodiments are not limited thereto. In some exemplary embodiments, the mobile device 600 includes a plurality of card socket devices into which a plurality attachable cards can be inserted and can further accommodate grooves that respectively accommodate the card socket devices. In some embodiments, the plurality of attachable cards are of different types. Depending on the types of the plurality of attachable cards, for example, a card socket device and a shape of a relevant accommodating groove can change.

According to exemplary embodiments, the card socket device S and the accommodating groove G can be used to mount various types of attachable cards. According to exemplary embodiments, if the mobile device 600 is a global positioning system (GSM) mobile wireless terminal, the card socket device S and the accommodating groove G mount a SIM card. The SIM card can store information for a terminal subscriber and information associated with a terminal system. Therefore, in some embodiments, when a SIM card is mounted on a terminal, the terminal can be used according to information stored in the SIM card, regardless of a terminal type.

In addition, according to exemplary embodiments, a user identification module (UIM) card can be mounted on a code division multiple access (CDMA) type mobile wireless terminal. In addition to a SIM or UIM card, the card socket device S and the accommodating groove G can be used to mount an external memory card as an auxiliary memory device. For example, the memory card can be a T-Flash card. The mobile device 600 may extend its storage space by mounting the external memory card.

In some exemplary embodiments, the mobile device 600 includes a first socket for mounting an identification module card, a second socket for mounting a memory card, and first and second accommodating grooves for respectively accommodating the first second sockets.

Figure 24:
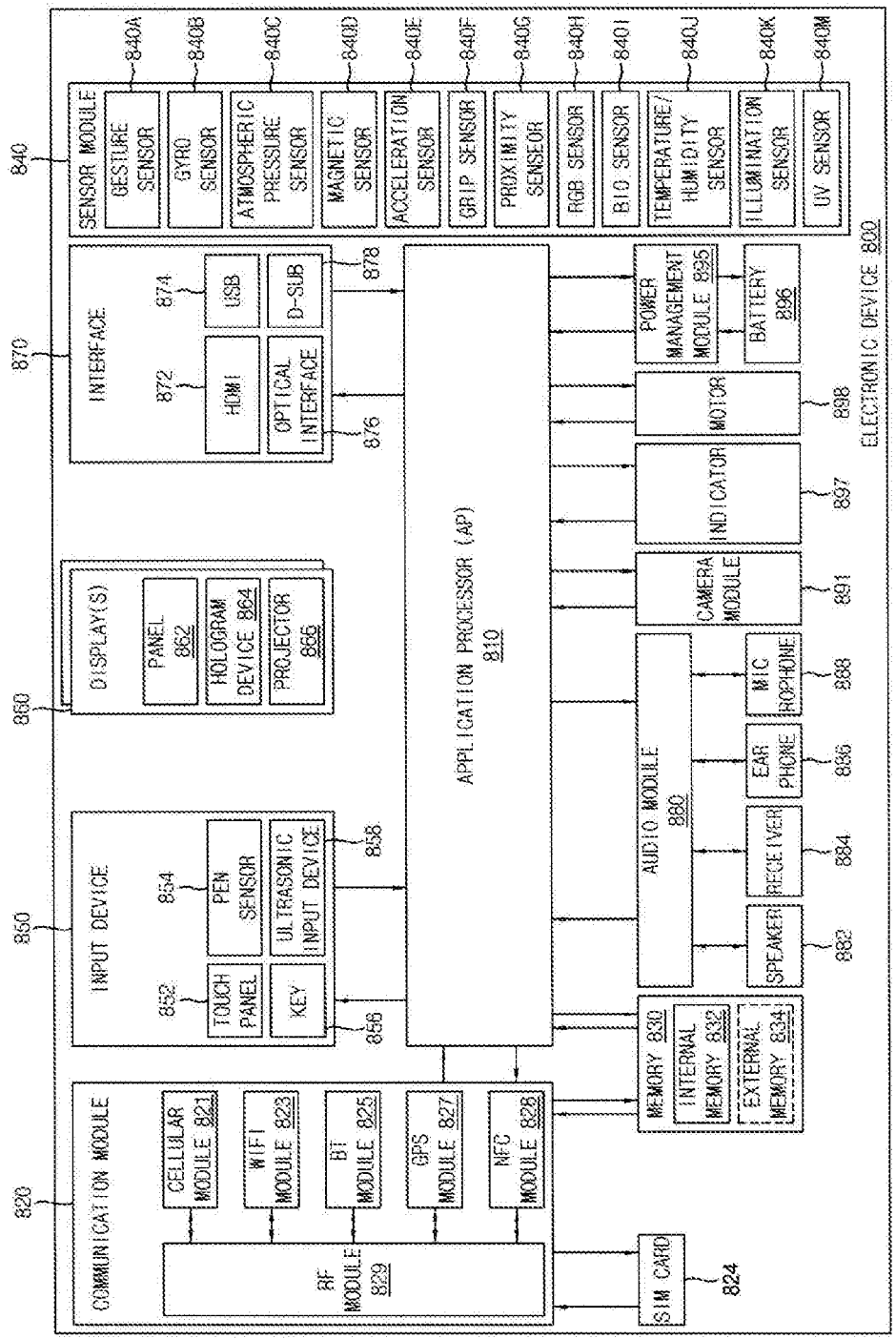
FIG. 24 is a block diagram of an electronic device according to exemplary embodiments.

FIG. 24 is a block diagram of an electronic device according to exemplary embodiments.

Referring to FIG. 24, according to exemplary embodiments, the electronic device 800 incorporates at least a portion of the mobile device 10 of FIG. 1. The electronic device 800 includes at least one application processor (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

According to exemplary embodiments, the AP 810, which may be the application processor 100 of FIG. 1, controls a plurality of hardware and software components connected to the AP 810 and also performs various data processing operations with multimedia data by executing an operating system or an application program. The AP 810 can be implemented by a system on chip (SoC), for example. According to an embodiment of the present disclosure, the AP 810 further includes a graphic processing unit (GPU).

According to exemplary embodiments, the communication module 820, which may be the communication interface 160 of FIG. 2A, performs data transmission/reception through communication between other electronic devices connected to the electronic device 800 via a network. According to an embodiment of the present disclosure, the communication module 820 include a cellular module 821, a Wi-Fi module 823, a Bluetooth (BT) module 825, a GPS module 827, a near field communication (NFC) module 828, and a radio frequency (RF) module 829.

According to exemplary embodiments, the SIM card 824 can be inserted into a slot formed in an electronic device. The SIM card 824 includes unique identification information, such as an integrated circuit card identifier (ICCID), or subscriber information, such as an international mobile subscriber identity (IMSI).

According to exemplary embodiments, the memory 830 includes an internal memory 832 or an external memory 834. The internal memory 832 may be a Solid State Drive (SSD). The external memory 834 may include a flash drive, such as a compact flash (CF), a secure digital (SD), a micro Micro-SD, a Mini-SD, an extreme digital (xD), or a memory stick. The external memory 834 can be functionally connected to the electronic device 800 through various interfaces.

According to exemplary embodiments, the sensor module 840 measures physical quantities or detects an operating state of the electronic device 800, thereby converting the measured or detected information into electrical signals. The sensor module 840 includes at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H, such as a red, green, or blue (RGB) sensor, a biometric sensor 840I, a temperature/humidity sensor 840J, an illumination sensor 840K, and an ultra violet (UV) sensor 840M. Additionally or alternatively, the sensor module 840 can include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 840 may further include a control circuit for controlling at least one sensor therein.

According to exemplary embodiments, the input device 850 includes a touch panel 852, a (digital) pen sensor 854, a key 856, and an ultrasonic input device 858. The touch panel 852 can recognize a touch input through at least one of a capacitive, resistive, infrared, or ultrasonic methods, for example. In addition, the touch panel 852 further includes a control circuit. In the case of a capacitive method, both direct touch and proximity recognition are possible. The touch panel 852 may further include a tactile layer. In this case, the touch panel 852 can provide a tactile response to a user.

According to exemplary embodiments, the display 860 includes a panel 862, a hologram device 864, and a projector 866.

According to exemplary embodiments, the interface 870 includes an HDMI 872, a USB 874, an optical interface 876, and a D-subminiature (D-sub) 878, for example. The interface 870 may be included in the communication interface 160 shown in FIG. 1. Alternately or in addition, the interface 870 can include a mobile high-definition link (MHL) interface, an SD card/multi-media card (MMC) interface, or an infrared data association (IrDA) standard interface.

According to exemplary embodiments, the audio module 880 converts sound into electrical signals and converts electrical signals into sounds. The audio module 880 processes sound information received/outputted through a speaker 882, a receiver 884, an earphone 886, or a microphone 888.

According to exemplary embodiments, the camera module 891, which is a device for capturing still images and videos, includes at least one image sensor, such as a front sensor or a rear sensor, a lens, an image signal processor (ISP), and a flash, such as an LED or a xenon lamp.

According to exemplary embodiments, the power management module 895 manages power of the electronic device 800. The power management module 895 can include a power management IC (PMIC), a charger IC, or a battery or fuel gauge, for example.

According to exemplary embodiments, a PMIC can be built into an IC or SoC semiconductor. A charging method can be classified as a wired method or a wireless method. The charger IC charges a battery and prevents overvoltage or overcurrent flow from a charger. According to an embodiment of the present disclosure, the charger IC is adapted for at least one of a wired charging method and a wireless charging method. Wireless charging methods include, for example, a magnetic resonance method, a magnetic induction method, or an electromagnetic method. An additional circuit for wireless charging, such as a coil loop, a resonant circuit, or a rectifier circuit, may be added.

According to exemplary embodiments, the battery gauge measures the remaining charge of the battery 896, or a voltage, current, or temperature of the battery 896 during charging. The battery 896 stores and generates electricity and supplies power to the electronic device 800 using the stored or generated electricity. The battery 896, may be a rechargeable battery or a solar battery.

According to exemplary embodiments, the indicator 897 displays a specific state of the electronic device 800 or part thereof, such as the AP 810, such as a booting state, a message state, or a charging state. The motor 898 converts electrical signals into mechanical motion. The electronic device 800 may include a processing device, such as a GPU, for mobile TV support. A processing device for mobile TV support processes media data according to standards such as the digital multimedia broadcasting (DMB) standard, the digital video broadcasting (DVB) standard, or the media flow standard.

Each of the above-mentioned components of the electronic device according to various embodiments of the present disclosure can be configured with at least one component and a name of a corresponding component may vary according to the type of electronic device. An electronic device according to various embodiments of the present disclosure may include at least one of the above-mentioned components, may not include some of the above-mentioned components, or may further include another component. In addition, some of components in an electronic device according to various embodiments of the present disclosure can be configured as one entity, so that functions of previous corresponding components can be identically performed.

Exemplary embodiments can be incorporated in various devices connected to external storage.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a mobile device that includes an embedded storage having a first capacity and that includes a default area and a first free area, the method comprising:
   recognizing, in an application processor of the mobile device, that an external storage having a second capacity is connected to the mobile device, wherein the external storage includes a remaining area and a second free area,
   measuring, in the application processor, a performance of the external storage;
   comparing the performance of the external storage to a reference value;
   constituting a first redundant array of independent disks (RAID) from the first free area of the embedded storage and the second free area of the external storage, when the performance is equal to or greater than the reference value;
   determining a usage policy of the remaining area; and
   allocating workload by a memory control module of the application processor to the embedded storage and the external storage based on a first performance of the embedded storage and a second performance of the external storage.

2. The method of claim 1, wherein measuring the performance of the external storage comprises;
   measuring a sequential write performance of the external storage; and
   measuring a sequential read performance of the external storage,
   wherein the embedded storage and the external storage are nonvolatile.

3. The method of claim 1, further comprising, before constituting a first redundant array of independent disks (RAID):
   checking a capacity of the first free area in the embedded storage; and
   checking a usability of the external storage;
   wherein the default area of the embedded storage stores data and an operating program required for basic operations of the mobile device and the first free area stores application programs and user data,
   wherein the second capacity is equal to or greater than the first capacity, and
   a third capacity of the first free area is substantially the same as a fourth capacity of the second free area.

4. The method of claim 3, wherein determining a usage policy of the remaining area comprises constituting the remaining area into a second RAID different from the first RAID,
   wherein the first RAID is a stripe type and the second RAID is a span type.

5. The method of claim 3, wherein determining a usage policy of the remaining area comprises determining to use the remaining area as a spare area that replaces an. enhanced area in the embedded storage in which least significant bit (LSB) programs are executed, and
   wherein write data by an application program is stored in the remaining area.

6. The method of claim 3, wherein determining a usage policy of the remaining area comprises:
   determining to use the remaining area as a buffer area that stores random data generated by an application program; and
   storing data in the remaining area when the data generated by the application program is random data whose size is less than a threshold value.

7. The method of claim 3, wherein determining a usage policy of the remaining area comprises:
   determining to use the remaining area as a small data area that stores small data generated by an application program; and
   storing data in the remaining area when a size of the data generated by an application programs is less than a threshold value.

8. The method of claim 3, wherein determining a usage policy of the remaining area comprises;
   determining to use the remaining area as a parity area;
   generating parity data based on data generated by an application program; and
   storing the parity data in the remaining area.

9. The method of claim 3, wherein determining a usage policy of the remaining area comprises:
   determining to use the remaining area as a reserve area wherein a bad block of the first RAID is recovered; and
   replacing a bad block of the first RAID with a free block from the remaining area when a write operation fails in the bad block while writing data generated by an application programs to the first RAID.

10. The method of claim 3, wherein determining a usage policy of the remaining area comprises:
    determining to use the remaining area as a reserve area that increases a number of free blocks in the first RAID; and
    writing data to a free block in the remaining area by selecting the free block in the remaining area when there is no free block in the first RAID while writing the data generated by an application programs to the first RAID.

11. The method of claim 3, wherein the mobile device further includes a volatile memory device that temporarily stores driving data generated by an application program, and
    wherein determining a usage policy of the remaining area comprises determining to use the remaining area as a data swap memory region wherein the driving data stored in the volatile memory device is moved to the remaining area.

12. The method of claim 3, wherein determining a usage policy of the remaining area comprises determining to use the remaining area as a back-up area in which pre-loaded data is encrypted and the encrypted data is stored.

13. The method of claim 3. wherein determining a usage policy of the remaining area comprises:
    determining to use the remaining area as a cold data area that stores cold data generated by an application program, wherein the cold data has an access frequency that is less than a reference frequency;
    determining whether the data generated by the application program is cold data; and
    storing the data in the remaining area when the data is cold data.

14. A mobile device, comprising:
an embedded storage having a first capacity and that includes a default area and a first free area;
an application processor configured to execute the application programs, the application processor including a memory control module;
a volatile memory device that stores driving data used by at least one application program; and
an external memory interface configured to provide connection from the mobile device to an external storage, and
wherein when the external storage is connected to the mobile device, the external storage having a second capacity and includes a remaining area and a second free area, the memory control module is configured to:
measure a performance of the external storage;
compare the performance to a reference value;
constitute a first redundant array of independent disks (RAID) from the first free area of the embedded storage and the second free area of the external storage when the performance is equal to or greater than the reference value;
determine a usage policy of the remaining area; and
allocate workload to the embedded storage and the external storage based on a first performance of the embedded storage and a second performance of the external storage.

15. The mobile device of claim 14, wherein the default area of the embedded storage stores data and an operating program required for basic operations of the mobile device and the first free area that stores application programs and user data,
wherein the memory control module is configured to:
check a capacity of the first free area in the embedded storage; and
check a usability of the external storage,
wherein the second capacity is equal to or greater than the first capacity,
a third capacity of the first free region is substantially the same as a fourth capacity of the second free region, and
the embedded storage and the external storage are nonvolatile.

16. A method of operating a mobile device that includes an embedded storage, wherein the embedded storage includes a default area and a first free area, the method comprising:
recognizing that an external storage is connected to the mobile device, wherein the external storage includes a remaining area and a second free area;
checking a capacity of the first free area in the embedded storage;
checking a usability of the external storage;
comparing a performance of the external storage to a reference value;
constituting a first redundant array of independent disks (RAID) from the first free area of the embedded storage and the second free area of the external storage, when the performance of the external storage is equal to or greater than the reference value; and
determining a usage policy of the remaining area,
wherein the embedded storage and the external storage are nonvolatile.

17. The method of claim 16, further comprising:
measuring, in the application processor, the performance of the external storage, before checking a capacity of the first free area in the embedded storage; and
allocating workload by a memory control module of the application processor to the embedded storage and the external storage of the first RAIL) based on a first performance of the embedded storage and a second performance of the external storage.

18. The method of claim 17, wherein
the embedded storage has a first capacity, the external storage has a second capacity,
the second capacity is equal to or greater than the first capacity, and
a third capacity of the first free area is substantially the same as a fourth capacity of the second free area.

19. The method of claim 17, wherein measuring the performance of the external storage comprises:
measuring a sequential write performance of the external storage; and
measuring a sequential read performance of the external storage.

* * * * *